(12) United States Patent
Umstadt

(10) Patent No.: US 10,384,267 B2
(45) Date of Patent: Aug. 20, 2019

(54) ADJUSTABLE DAMPING ARRANGEMENT FOR A NON-ROTATING TOOL HOLDER

(71) Applicant: Fives Giddings & Lewis, LLC, Fond du Lac, WI (US)

(72) Inventor: David Umstadt, Markesan, WI (US)

(73) Assignee: FIVES GIDDINGS & LEWIS, LLC, Fond Du Lac, WI (US)

(*) Notice: Subject to any disclaimer, the term of this patent is extended or adjusted under 35 U.S.C. 154(b) by 47 days.

(21) Appl. No.: 15/686,569

(22) Filed: Aug. 25, 2017

(65) Prior Publication Data

US 2018/0093329 A1  Apr. 5, 2018

Related U.S. Application Data

(60) Provisional application No. 62/403,558, filed on Oct. 3, 2016.

(51) Int. Cl.
| | |
|---|---|
| *B23B 29/02* | (2006.01) |
| *B23Q 11/00* | (2006.01) |
| *B23B 27/00* | (2006.01) |
| *F16F 15/02* | (2006.01) |
| *F16F 7/104* | (2006.01) |

(52) U.S. Cl.
CPC .......... *B23B 27/002* (2013.01); *B23B 29/022* (2013.01); *B23Q 11/0039* (2013.01); *F16F 7/104* (2013.01); *F16F 15/02* (2013.01); *B23B 2210/02* (2013.01); *B23B 2250/16* (2013.01); *F16F 2222/08* (2013.01); *F16F 2230/0041* (2013.01); *F16F 2230/186* (2013.01)

(58) Field of Classification Search
CPC . B23B 29/022; B23B 27/002; B23B 2250/16; B23B 2260/004; B23B 2260/068; B23Q 11/0032; B23Q 11/0035; B23Q 11/0039; B23C 5/003; Y10T 408/76; Y10T 409/304312; F16F 15/02; F16F 2222/08; F16F 2230/0041; F16F 2230/186; F16F 7/104

See application file for complete search history.

(56) References Cited

U.S. PATENT DOCUMENTS

| | | | | |
|---|---|---|---|---|
| 3,447,402 | A | * 6/1969 | Ray | B23B 29/022 408/143 |
| 3,522,864 | A | * 8/1970 | Richter | B23Q 1/0063 188/268 |
| 3,559,512 | A | 2/1971 | Aggarwal | |

(Continued)

*Primary Examiner* — Nicole N Ramos
(74) *Attorney, Agent, or Firm* — Reising Ethington P.C.

(57) ABSTRACT

A damper assembly for use with a non-rotating tool holder includes a hollow ram for supporting a non-rotating tool and a damper assembly mounted in the hollow ram for absorbing vibrations of the ram. The damper assembly includes a front plate and a rear plate, an upper tie rod and a lower tie rod extending between the front plate and the rear plate, and a damper mass mounted between the front plate and the rear plate. Ring dampers are mounted between the damper mass and the front and rear plates, and suspension springs are mounted between the upper tie rod and the lower tie rod. The suspension springs carry the weight of the damper mass so that the ring dampers do not have to carry the weight of the damper mass, and the damper mass is free to respond to vibrations in the ram.

16 Claims, 7 Drawing Sheets

(56) References Cited

U.S. PATENT DOCUMENTS

| | | | |
|---|---|---|---|
| 3,582,226 A * | 6/1971 | Shurtliff | B23B 29/022 408/143 |
| 3,774,730 A | 11/1973 | Maddux | |
| 3,820,422 A * | 6/1974 | Rivin et al. | B23B 29/022 408/143 |
| 3,838,936 A | 10/1974 | Andreassen et al. | |
| 4,553,884 A | 11/1985 | Fitzgerald et al. | |
| 5,170,103 A | 12/1992 | Rouch et al. | |
| 5,342,017 A | 8/1994 | McCalmont et al. | |
| 5,413,318 A | 5/1995 | Andreassen | |
| 5,494,269 A | 2/1996 | McCalmont et al. | |
| 5,518,347 A | 5/1996 | Cobb, Jr. | |
| 5,535,496 A * | 7/1996 | Sugino | B08B 3/02 29/39 |
| 5,700,116 A | 12/1997 | Cobb, Jr. | |
| 5,871,315 A | 2/1999 | Burt et al. | |
| 6,443,673 B1 | 9/2002 | Etling et al. | |
| 6,619,165 B2 | 9/2003 | Perkowski | |
| 6,719,503 B1 | 4/2004 | McCalmont et al. | |
| 8,656,807 B2 | 2/2014 | McCalmont | |
| 8,752,811 B2 | 6/2014 | Mischler | |
| 8,827,609 B2 | 9/2014 | Ogura et al. | |
| 9,027,720 B2 | 5/2015 | Ogata | |
| 2013/0118848 A1 * | 5/2013 | Mischler | B23Q 11/0035 188/379 |

* cited by examiner

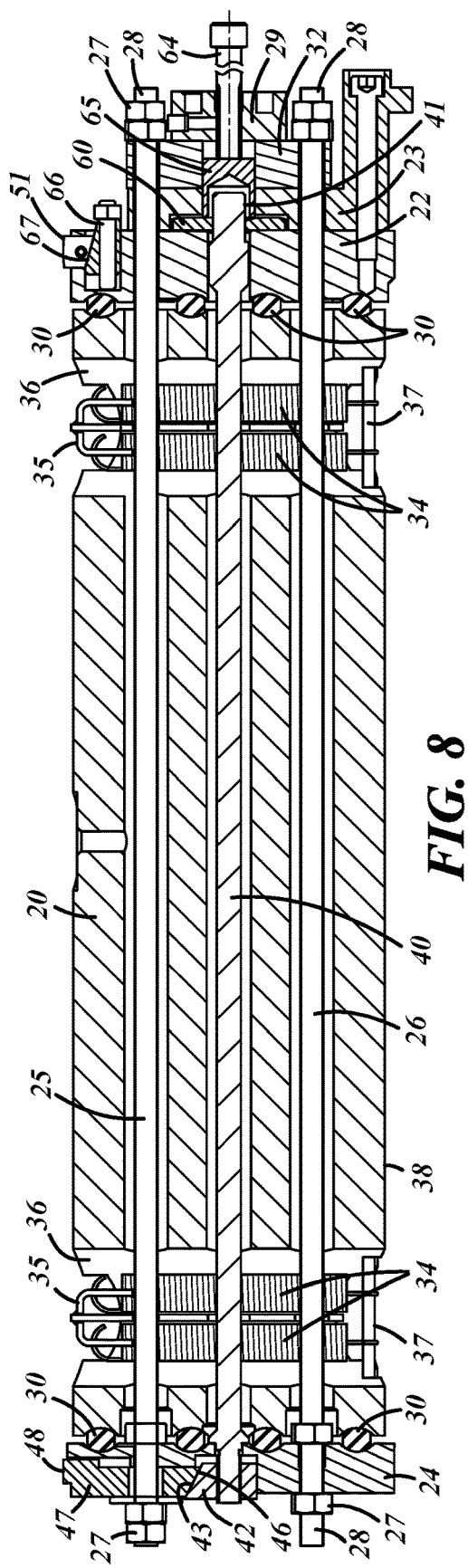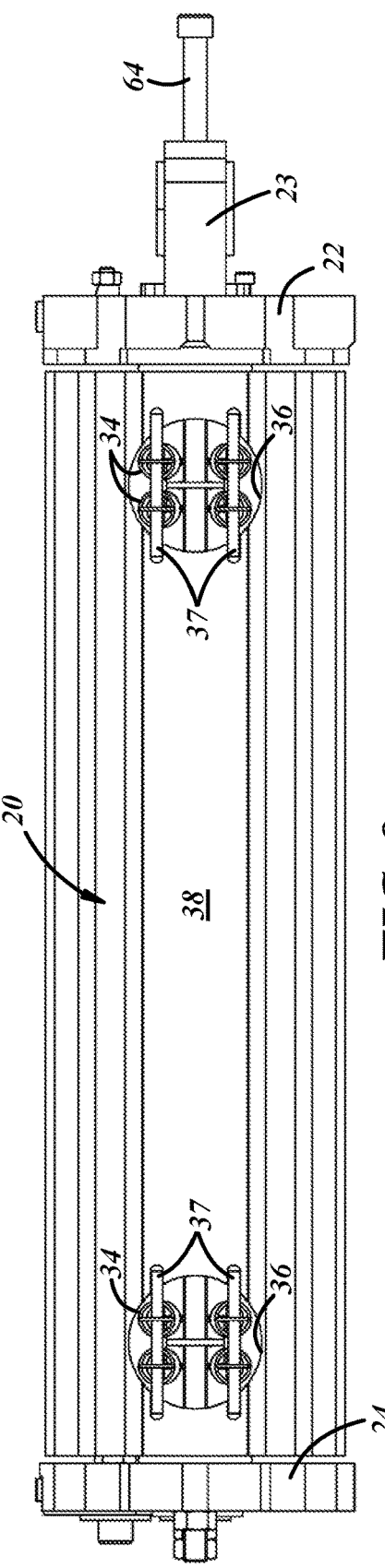
FIG. 8
FIG. 9

ADJUSTABLE DAMPING ARRANGEMENT FOR A NON-ROTATING TOOL HOLDER

FIELD

An adjustable damping arrangement for a non-rotating tool holder uses springs to suspend a damper mass in the interior of the ram and damping rubber rings that can be selectively compressed to adjust the dynamic stiffness of the ram.

BACKGROUND

Lathe cutting capability is limited by the dynamic stiffness of the machine tool structure. Cutting tools supported by narrow rams at long extensions on vertical lathes provide the reach to cut tall parts, but often lack adequate stiffness. The value of dynamic stiffness varies with frequency and is lowest at specific frequencies related to structural natural frequencies or modes. The minimum stiffness can be 50% or less than the stiffness at the rest of the frequencies, and defines the cutting capacity of the machine. The frequency, stiffness, modal mass, and damping can vary as the machine elements are moved over their operating ranges.

The critical characteristics of dynamic stiffness are static stiffness, mass, and damping. Static stiffness and mass are often dictated by the machine type and size and can be difficult to alter significantly. Damping which may be defined as the ability to absorb or neutralize vibrating energy can be increased through the addition of machine elements. Greater damping results in higher stiffness.

Adding a damper to the ram near the cutting tool will increase the cutting capacity of a vertical lathe. A spring-mass-damper may be tuned to a particular frequency for operation of the ram at the greatest extension, the lowest stiffness condition for the ram.

BRIEF DESCRIPTION OF THE DRAWINGS

FIG. 8 is a side sectional view of a damper assembly.

FIG. 9 is a bottom view of the damper assembly showing the suspension for the damper mass.

DESCRIPTION OF THE PREFERRED EMBODIMENT

Figure 1:
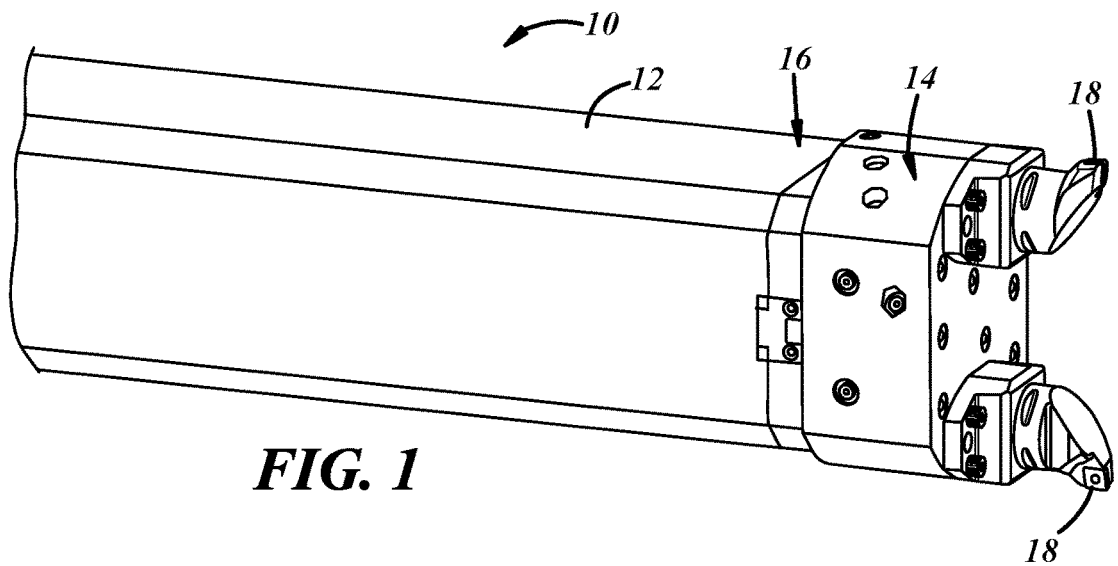
FIG. 1 is a perspective view of a ram with a cutting tool attached.

FIG. 1 is a perspective view of a ram generally designated by the reference numeral 10. The ram 10 may be used on a lathe and comprises a hollow beam 12 having an interior wall 13 best seen in FIG. 2. A cutting tool holder 14 may be mounted on the front end 16 of the ram 10 which may support one or more cutting tools 18. Although two tools 18 are shown in the drawing, only one tool at a time is used in a cutting operation. The ram may move vertically or horizontally during operation, but the ram 10 and the tools 18 do not rotate.

Figure 3:
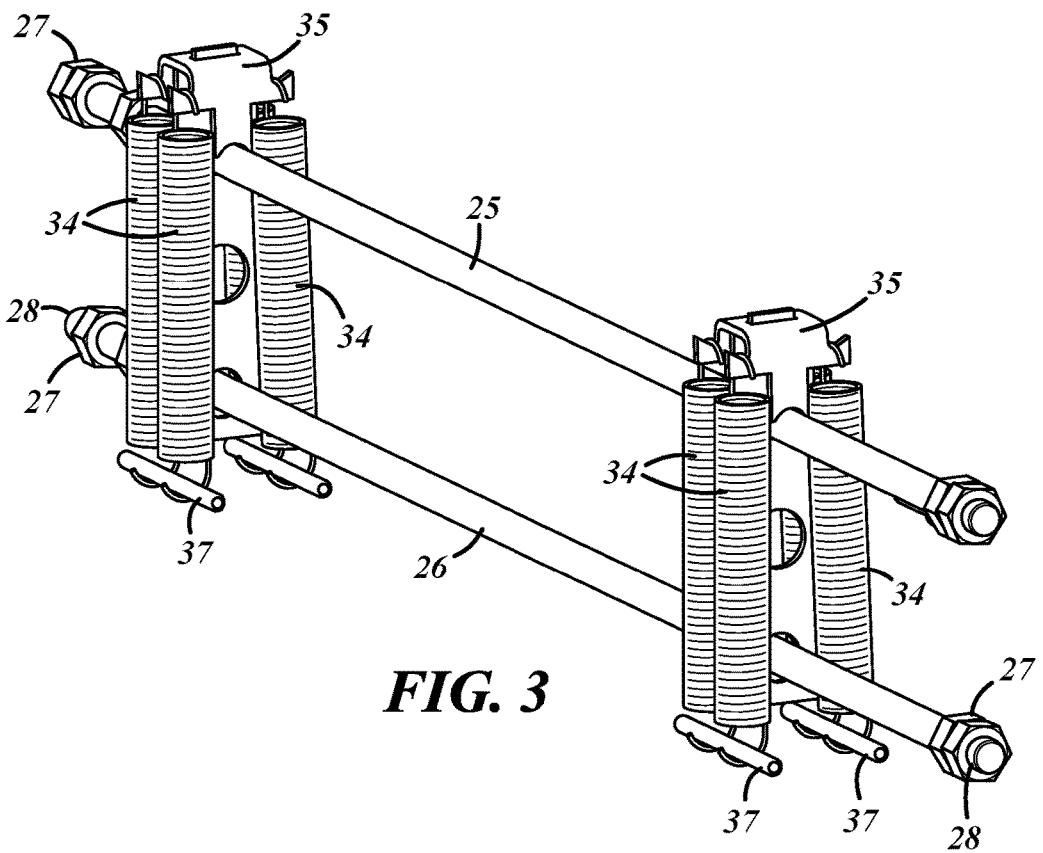
FIG. 3 is a perspective view of the tie rods and the suspension springs used in a damper assembly.
Figure 2:
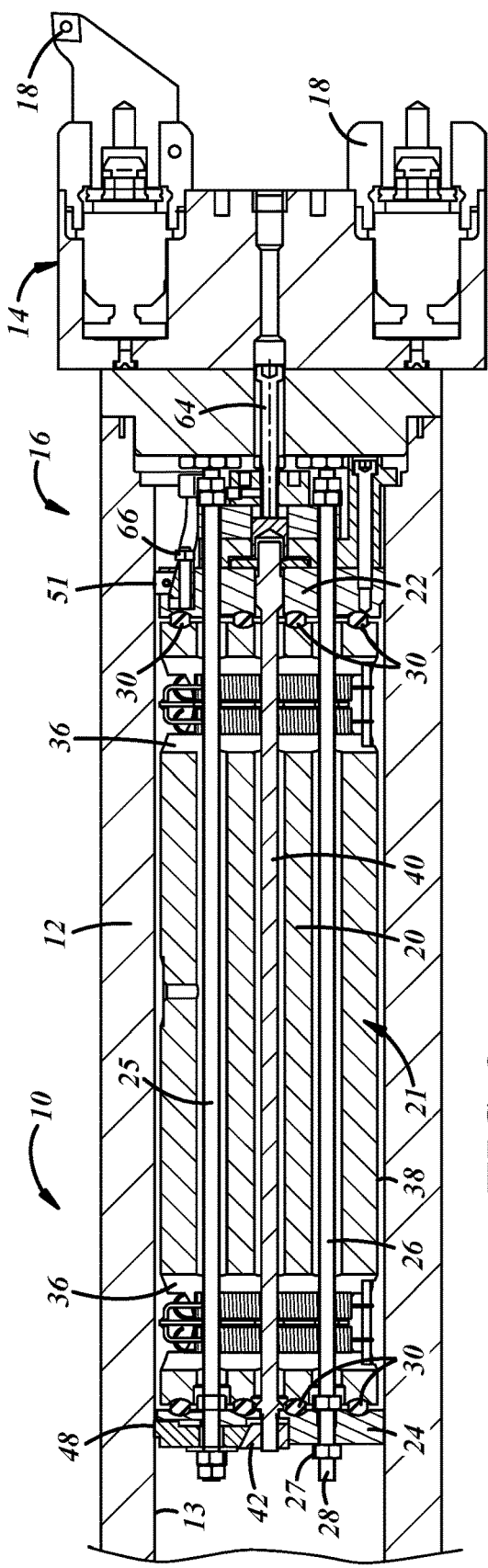
FIG. 2 is a side sectional view of a ram showing a mass damper installed in the interior of the ram.
Figure 4:
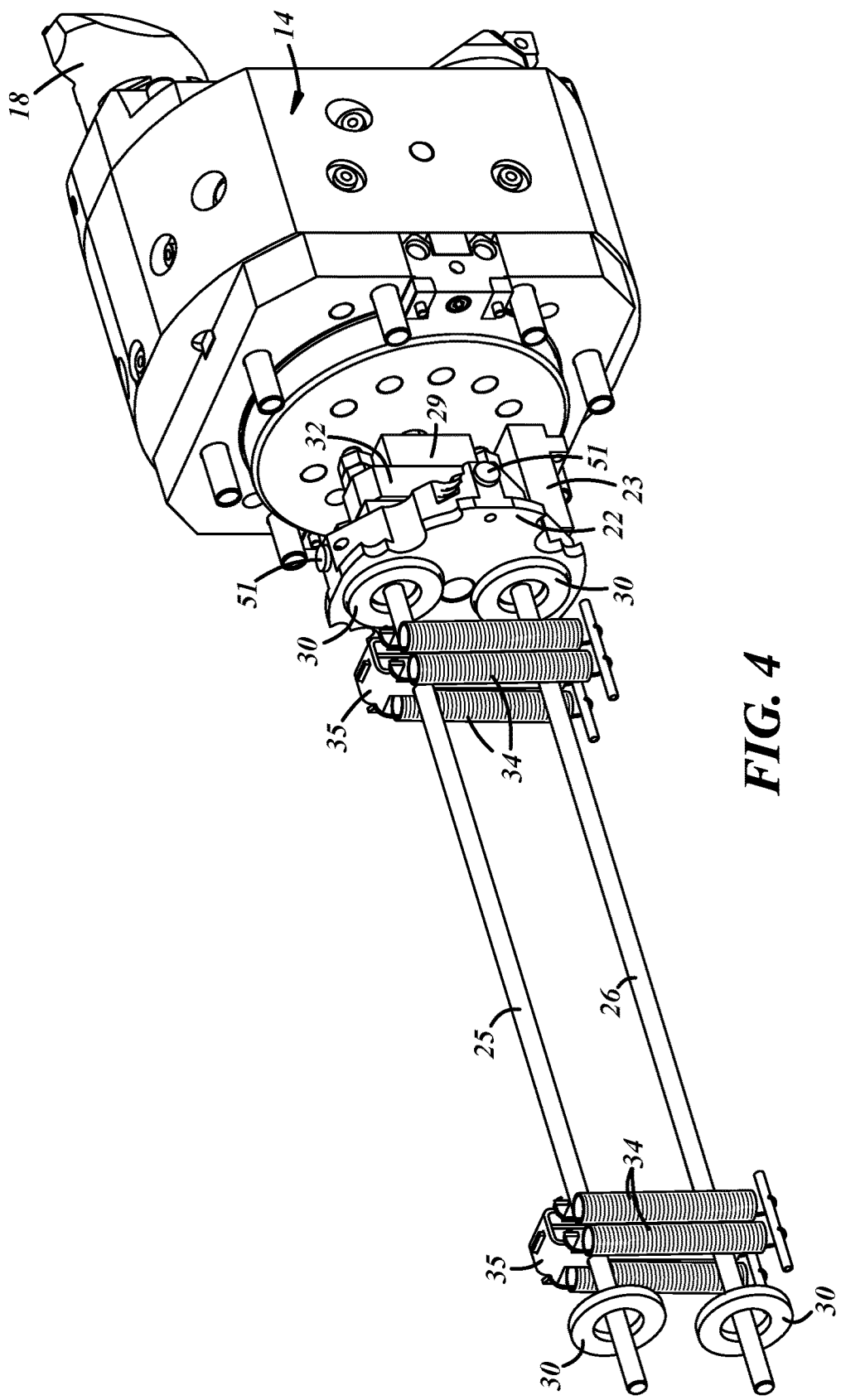
FIG. 4 is a perspective view of the tie rods connected to the front plate of a damper assembly and mounted on a tool holder.
Figure 5:
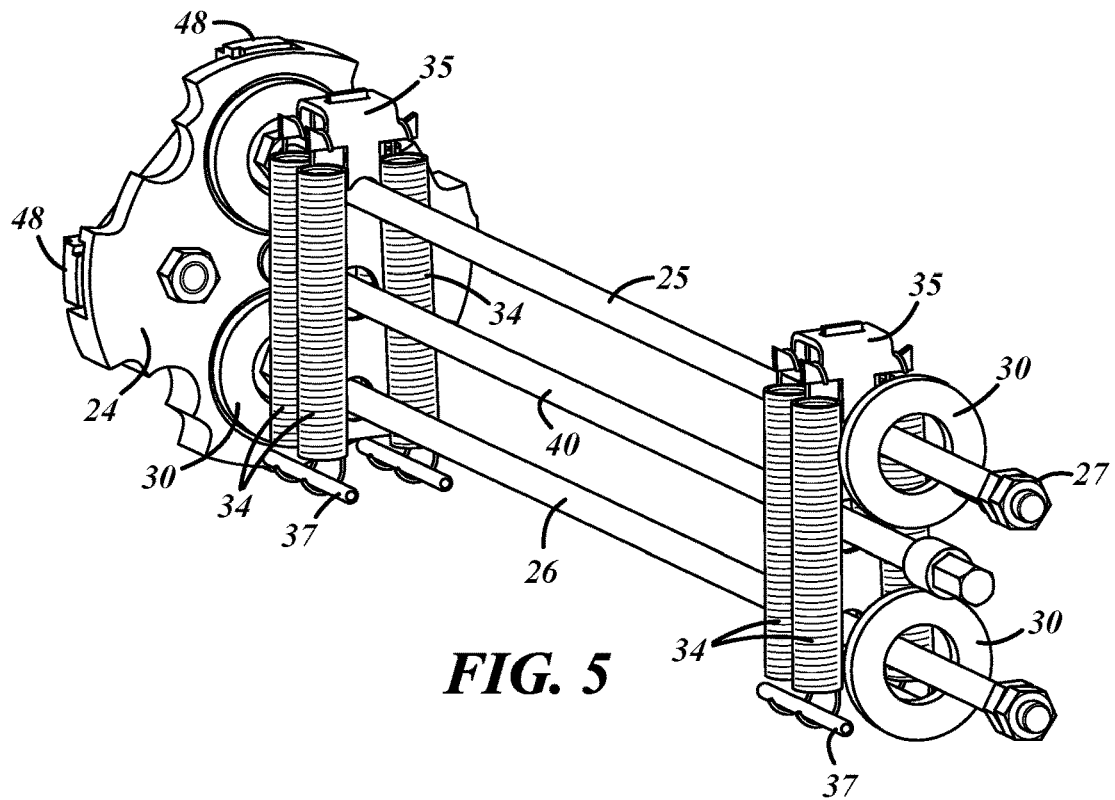
FIG. 5 is a perspective view of the tie rods, the tension rod, and the suspension springs of a damper assembly.
Figure 6:
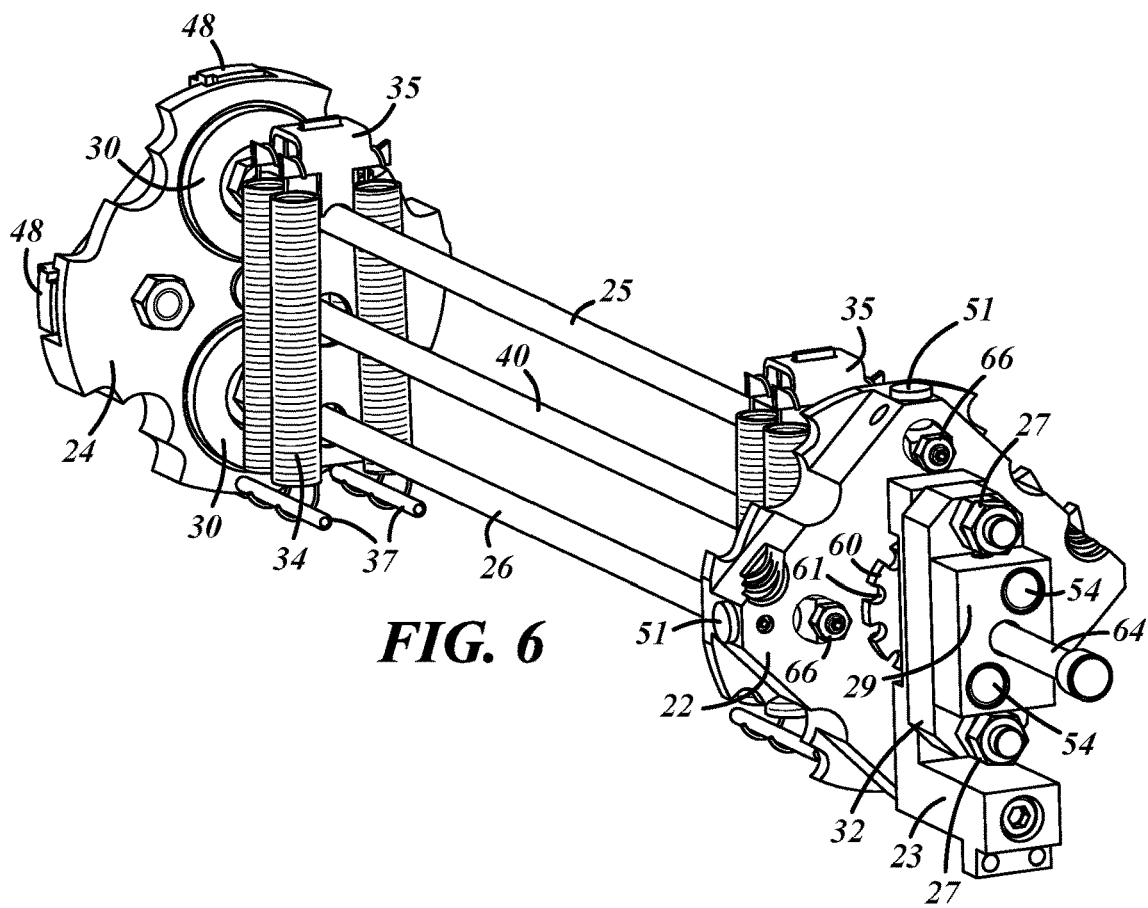
FIG. 6 is a perspective view of the tie rods, the tension rod, and the suspension springs attached to the front plate of a damper assembly.

FIG. 2 is a side sectional view of a ram 10 showing a damper assembly 21 having a damper mass 20 installed in the interior of the ram 10. The damper mass 20 may be mounted between a front plate 22 and a rear plate 24 in the interior of the hollow beam 12. Upper and lower tie rods 25 and 26, respectively, pass through the front plate 22, the damper mass 20, and the rear plate 24. Ring dampers in the form of stiff rubber rings 30 best seen in FIGS. 4, 5, and 6 are positioned between the damper mass 20 and the front and rear plates 22 and 24, respectively. As shown on FIGS. 3 and 8, tie rod nuts 27 may be used on the threaded ends 28 of the tie rods 25 and 26 to fix the distance between the front plate 22 and the rear plate 24.

Figure 10:
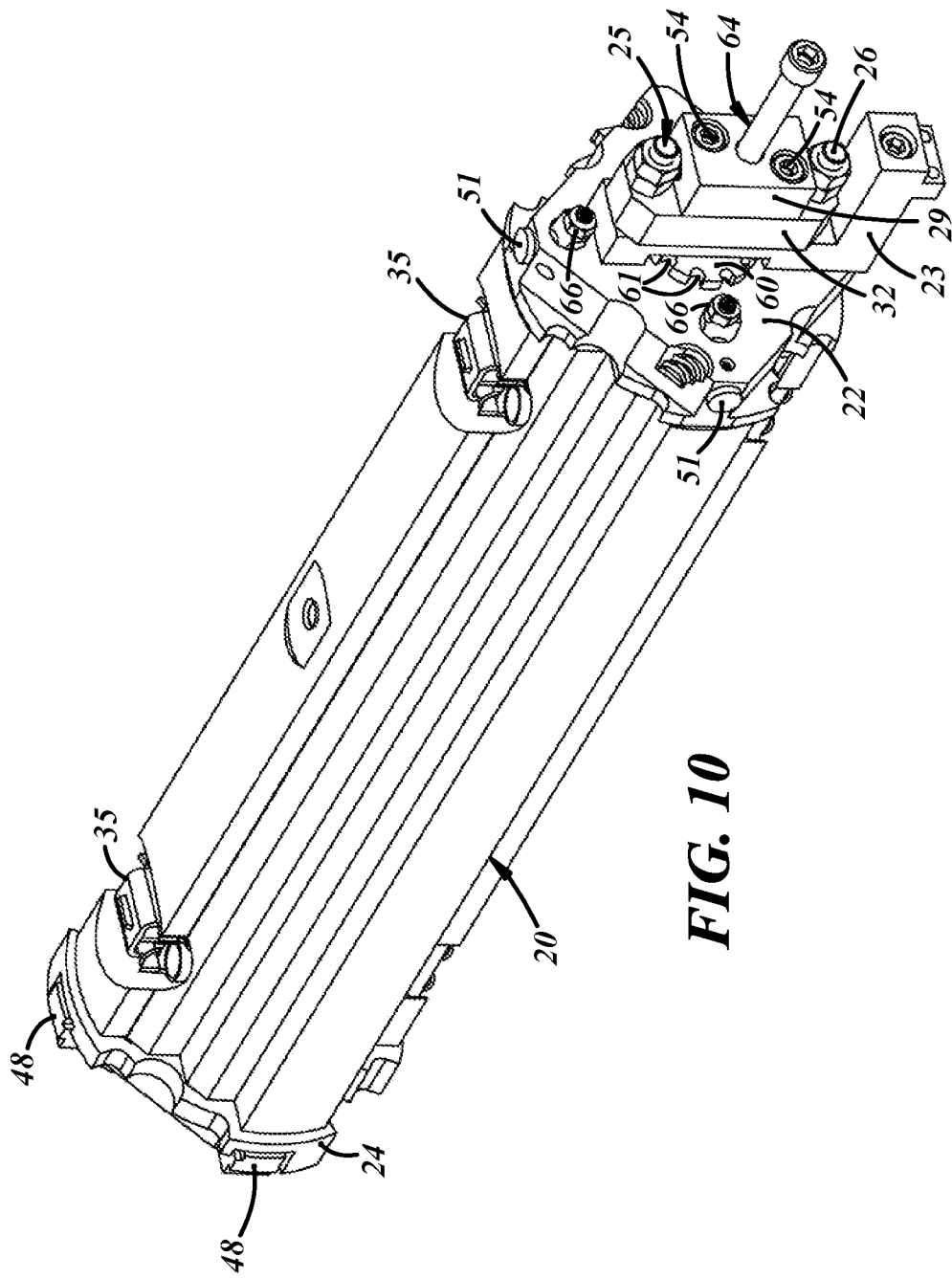
FIG. 10 is a perspective view of the damper assembly.

As shown on FIGS. 6, 8, and 10, the ends of the tie rods 25 and 26 pass through a tie rod mounting block 32 that is positioned on an end bracket 23 that is mounted on the front plate 22. A tuning bolt 64 may be threaded into a tuning block 29 and may be mounted on the tie rod mounting block 32 by bolts 54. The end of the tuning bolt 64 abuts a tuning bolt spacer 65. A slotted disk 60 may be positioned between the end bracket 23 and the front plate 22, and the slotted disk 60 may be formed with a hex shaped center aperture 31 which engages a hex head end 41 on a tension rod 40. The slots 61 in the disk 60 may be engaged by a disk locking bolt (not shown) to prevent the disk 60 from rotating as explained more fully below.

As shown on FIGS. 3-6 suspension springs 34 may be used to support the damper mass 20 from the upper tie rod 25. The suspension springs 34 may be hung from suspension brackets 35 which rest on the upper tie rod 25. The suspension springs 34 pass through vertical bores 36 in the damper mass 20 (best seen in FIGS. 2 and 3) and hook onto support pins 37 which engage the bottom surface 38 of the damper mass 20. Eight suspension springs 34 are shown supporting the damper mass 20, four near the front plate 22 and four near the rear plate 24, but a fewer or a greater number of suspension springs may be used.

Figure 11:
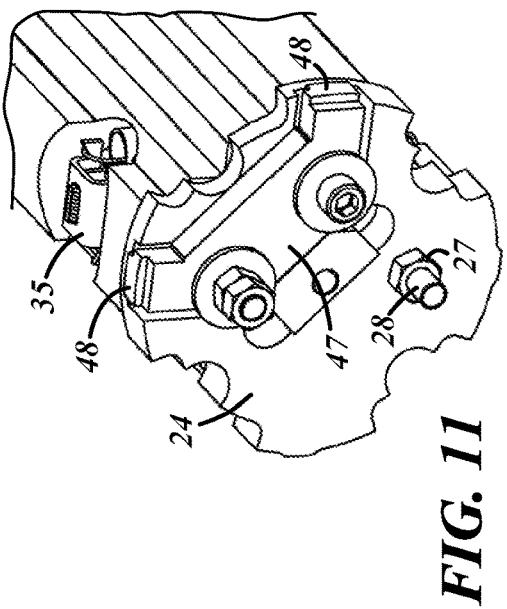
FIG. 11 is a perspective view of the rear plate of the damper assembly.
Figure 7:
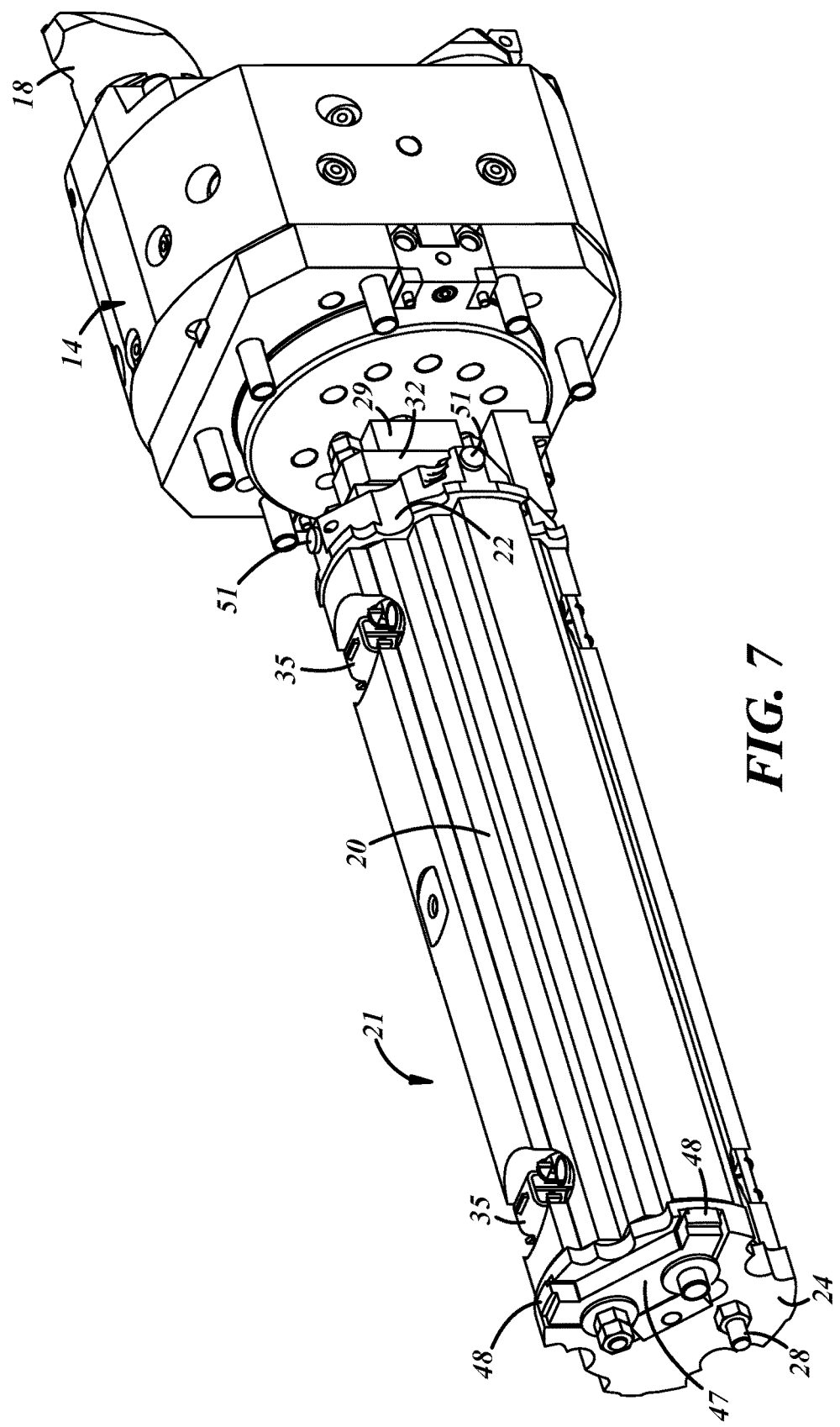
FIG. 7 is a perspective view of a damper assembly mounted on a tool holder.

As shown in FIG. 8, the tension rod 40 passes through the center of the damper mass 20 and is threaded into a plug 42 having a cam surface 43 mounted in a bore in the rear plate 24. The cam surface 43 engages a follower surface 46 on a locking lever 47 as shown on FIGS. 7, 8 and 11. As shown in FIG. 7, the locking lever 47 has two locking feet 48 which are positioned near the outer periphery of the rear plate 24. Movement of the cam surface 43 toward the damper mass 20 causes the locking lever 47 to move radially outward toward periphery of the rear plate 24.

As shown in FIG. 9, the support pins 37 may be threaded through the ends of the suspension springs 34 to support the bottom surface 38 of the damper mass 20. Thus, the upper and lower tie rods 25 and 26, respectively, do not have to squeeze the stiff rubber rings 30 with enough force to support the weight of the damper mass 20. The suspension springs 34 provide sufficient freedom of movement to the damper mass 20 so that it is able to damp the vibrations in the ram 10.

As shown in FIG. 10, the front plate 22 may have two locking pistons 51 positioned near the outer periphery of the front plate 22. The pistons 51 are actuated by bolts 66 which have a cam surface 67. FIG. 8 shows the cam surface 67 on one of the bolts 66 that is used to force the locking piston 51 outward as the bolt 66 draws the cam surface 67 against the locking piston 51.

In order to install the damper into the ram, the following procedure may be used. The damper assembly 21 may be inserted into the interior of the ram 10 and the front plate 22 rests against the interior wall 13. Bolts 66 may then be tightened forcing the cam 69 to move the locking pistons 51 outward to secure the front plate 22 against the interior wall 13 of the ram. Next the tension rod 40 may be tightened (which also rotates the slotted disk 60) to draw the plug 42 into the bore in the rear plate 24 to force the locking lever 47 and the locking feet 48 against the interior wall 13 of the ram. The tension rod 40 is only tightened enough to remove any looseness in the fit of the damper assembly 21 in the bore of the hollow beam 12 and provide light contact pressure against the interior wall 13 of the ram. At this point in the installation, the rear plate 24 will be snug in the ram bore yet will be able to slide axially when the rubber rings 30 are compressed. To prevent the tension rod 40 from vibrating loose, a locking bolt (not shown) may be inserted into one of the slots 61 in the slotted disk 60 and threaded into the front plate 22 to prevent rotation of the disk 60 and loosening of the tension rod 40. The slots 61 in the disk 60 may be spaced differently from the threaded openings in the front plate 22 that receives the locking bolt. This difference operates as a Vernier and allows the disk 60 to be located at increments that are smaller than the spacing between adjacent slots 61.

The upper and lower tie rods 25 and 26 exert pressure on the stack of parts consisting of the rear plate 24, the rear rubber rings 30, the damper mass 20, the front rubber rings 30, the front plate 22, the end bracket 23 and the tie rod mounting block 32. The tie rod nuts 27 on the upper and lower tie rods 25 and 26 are set to the length of the components with no pressure on the rubber rings 30. In this adjustment, the rubber rings 30 are in their loosest state, and the damper frequency is low.

The dynamic stiffness of the ram may be adjusted by tuning the damper mass 20 to a particular frequency. The resonant frequency of the damper mass 20 may be adjusted to the resonant frequency of the ram by compressing the rubber rings 30.

In order to compress the rubber rings 30, the tuning bolt 64 is used. The tuning bolt 64 is threaded into the tuning block 29, and the end of the tuning bolt 64 abuts the tuning bolt spacer 65. Turning the tuning bolt 64 advances it into the tuning block 29 and presses onto the tuning bolt spacer 65, the slotted disc 60, and the front plate 22 to increase the compression on the rubber rings 30.

In use, the locking feet 48 mechanically couple the rear plate 24 to the interior wall 13 of the ram 10, and the locking pistons 51 couple front plate to the interior wall 13 of the ram 10. The front plate 22 and the rear plate 24 transfer vibration of the ram 10 to the rubber rings 30 which react against the damper mass 20 to absorb vibrational energy of the ram. Because the suspension springs 34 support the weight of the damper mass 20, and the upper and lower tie rods 25 and 26 do not have to squeeze the stiff rubber rings 30 with enough force to support the weight of the damper mass 20, the damper mass 20 has sufficient freedom of movement so that it is able to damp the vibrations in the ram 10.

Having thus described the device, various modifications and alterations will occur to those skilled in the art, which modifications and alterations are intended to be within the scope of the device as defined by the appended claims.

The invention claimed is:

1. A damper assembly for use with a non-rotating tool holder, the damper assembly comprising:
   a hollow ram for supporting a non-rotating tool;
   a damper assembly mounted in the hollow ram for absorbing vibrations of the hollow ram, the damper assembly comprising;
   a front plate and a rear plate mounted in the hollow ram;
   an upper tie rod and a lower tie rod extending between the front plate and the rear plate;
   a damper mass mounted between the front plate and the rear plate;
   ring dampers mounted between the damper mass and the front and rear plates;
   suspension springs that support the damper mass from the upper tie rod extending radially away from the upper tie rod, the suspension springs carrying the weight of the damper mass, whereby the ring dampers do not carry the weight of the damper mass and the damper mass is free to respond to vibrations in the ram.

2. The damper assembly of claim 1 further comprising:
   at least one locking foot mounted on the rear plate;
   a tension rod extending between the front plate and the rear plate and passing through the damper mass, whereby the tension rod extends the at least one locking foot to mechanically couple the rear plate to the interior of the hollow ram.

3. The damper assembly of claim 2 further comprising:
   a locking lever mounted on the rear plate;
   a plug mounted in the rear plate and engaged with the tension rod;
   a cam surface on the plug and a follower surface on the locking lever engaged with the cam surface on the plug, whereby the tension rod may be tightened to force the cam surface of the plug against the follower surface on the locking lever to extend the at least one locking foot on the locking lever into engagement with the interior wall of the hollow ram.

4. The damper assembly of claim 3 further comprising:
   at least one piston mounted on the front plate; and
   at least one actuating bolt on the front plate with a cam surface in engagement with the at least one piston, whereby the actuating bolt may be used to extend the at least one piston into engagement with the interior wall of the hollow ram.

5. The damper assembly of claim 4 further comprising:
   a slotted disk mounted on the front plate, the slotted disk being coupled to the tension rod, whereby rotation of the tension rod causes a rotation of the slotted disk, and wherein the slotted disk may be locked against rotation to prevent rotation of the tension rod.

6. The damper assembly of claim 1 further comprising:
   a cutting tool holder mounted on an end of the hollow ram;
   at least one cutting tool mounted on the cutting tool holder, wherein the damper assembly is mounted in the hollow ram in the same end of the hollow ram as the cutting tool holder.

7. The damper assembly of claim 6 further comprising:
   two cutting tools mounted on the cutting tool holder.

8. The damper assembly of claim 1 further comprising:
   vertical bores formed in the damper mass; and,
   support pins engaging a bottom surface of the damper mass, wherein the suspension springs pass through the vertical bores and the support pins are threaded through the ends of the suspension springs to support the damper mass.

9. The damper assembly of claim 8 further comprising:
two vertical bores formed in the damper mass; and,
at least four suspension springs comprising the suspension springs, wherein the at least four suspension springs are divided equally between the two vertical bores.

10. The damper assembly of claim 9 further comprising:
eight suspension springs comprising the suspension springs, wherein four suspension springs are positioned in a first vertical bore and four suspension springs are positioned in a second vertical bore.

11. The damper assembly of claim 3 wherein the tension rod is tightened to draw a plug into a bore and to extend a locking lever against the interior wall of the ram, whereby a light contact pressure is provided against the interior inner wall of the ram and the rear plate will be snug in the ram bore.

12. The damper assembly of claim 7 wherein only one tool at a time is used in a cutting operation.

13. The damper assembly of claim 8 wherein the damper assembly is used in a non-rotating operation and the vertical bores remain in a vertical orientation during the use of the hollow ram and the least one tool.

14. The damper assembly of claim 1 further comprising:
rubber rings comprising the ring dampers.

15. The damper assembly of claim 3 further comprising:
two locking feet formed on either end of the locking lever, whereby the locking feet engage the interior wall of the hollow beam near the outer periphery of the rear plate.

16. The damper assembly of claim 1 further comprising:
two pistons mounted on the front plate, whereby the two pistons are mounted at spaced locations near the outer periphery of the front plate, and whereby the two pistons are movable outward to engage an interior wall of the ram.

* * * * *